(12) United States Patent
Wang et al.

(10) Patent No.: US 7,381,017 B2
(45) Date of Patent: Jun. 3, 2008

(54) DETECTING AND SUPPRESSING METHODS FOR MILLING TOOL CHATTER

(75) Inventors: Shih-Ming Wang, Taipei County (TW); Hsiang-Yung Hsieh, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 480 days.

(21) Appl. No.: 11/186,771

(22) Filed: Jul. 22, 2005

(65) Prior Publication Data

US 2006/0159538 A1   Jul. 20, 2006

(30) Foreign Application Priority Data

Jan. 18, 2005   (TW) .................................. 94101408

(51) Int. Cl.
 *B23Q 11/00* (2006.01)
(52) U.S. Cl. ........................ 409/131; 700/280; 340/683
(58) Field of Classification Search ................ 409/131, 409/141, 186, 187, 193, 194, 207; 82/903, 82/904; 408/143; 700/174, 175, 177, 280; 340/683; 73/430, 514.12
 See application file for complete search history.

(56) References Cited

U.S. PATENT DOCUMENTS

| | | | | |
|---|---|---|---|---|
| 5,170,358 A | * | 12/1992 | Delio | 700/177 |
| 5,518,347 A | * | 5/1996 | Cobb, Jr. | 409/141 |
| 5,523,701 A | * | 6/1996 | Smith et al. | 324/772 |
| 5,700,116 A | * | 12/1997 | Cobb, Jr. | 409/141 |
| 5,784,273 A | * | 7/1998 | Madhavan | 700/175 |
| 5,957,016 A | * | 9/1999 | Segalman et al. | 409/141 |
| 6,085,121 A | * | 7/2000 | Stern | 700/175 |
| 6,189,426 B1 | * | 2/2001 | Segalman et al. | 409/141 |
| 6,241,435 B1 | * | 6/2001 | Huang et al. | 409/141 |
| 6,349,600 B1 | * | 2/2002 | Davies et al. | 73/660 |
| 6,993,410 B2 | * | 1/2006 | Esterling | 409/131 |
| 2002/0146296 A1 | * | 10/2002 | Schmitz et al. | 409/131 |
| 2005/0021265 A1 | * | 1/2005 | Esterling | 702/76 |

* cited by examiner

*Primary Examiner*—Dana Ross
(74) *Attorney, Agent, or Firm*—Birch, Stewart, Kolasch & Birch, LLP

(57) ABSTRACT

A detecting and suppressing control method for milling tool chatter. Milling parameters are defined. A milling device is initiated using the milling parameters. Milling signals are extracted using a sensor installed on the milling device. It is determined whether chatter relating to the milling device occurs, comprising determining whether the milling signals are high frequency signals, and, if the milling signals are high frequency signals, determining whether signal points generated based on the milling signals are located in a stable area derived using a sliding function. When the signal points are located in the stable area, the milling signals are stable milling signals. When the signal points are located outside the stable area, rotational rates of a spindle of the milling device are adjusted.

10 Claims, 17 Drawing Sheets
(3 of 17 Drawing Sheet(s) Filed in Color)

_(1)_

DETECTING AND SUPPRESSING METHODS FOR MILLING TOOL CHATTER

BACKGROUND

The invention relates to system control, and more particularly, to detecting and suppressing control methods for milling tool chatter.

A [Machine Tool] used in facility manufacturing is driven by a power source, manufacturing metallic workpieces using physical, chemical, or other processes for formation. Manufacturing methods comprise milling or grinding metallic workpieces to desired shape, size, and surface precision. Manufacturing technologies for machine tools have rapidly developed, comprising high speed milling (HSC) and high speed feeding (HSF) methods.

HSC enhances metal removal rate to reduce process time and cost and result in higher surface precision. To harmonize with running efficiency of a machine tool, milling parameters can only be set within a fixed range, or the machine tool generates chatter during milling. When chatter occurs, workpieces may become unusable or damaged, and even the machine tool may experience damage. Current detecting and suppressing methods for chatter change structural features based on structural mode of a machine tool or utilize related controls.

In the Hualizhong Li and Xiaoping Li disclosure MODELING AND SIMULATION OF CHATTER IN MILLING USING A PREDICTIVE FORCE MODEL, simulating and predicting milling force degrees and chatter states creates a dynamic milling model.

In the S. K. KIM and S-Y. Lee disclosure CHATTER PREDICTION OF END MILLING IN A VERTICAL MACHINING CHATTER, a dynamic milling model is created according to geometrical characteristics of milling tools affecting milling force to predict whether chatter occurs in a vertical milling tool.

In the K. J. Lin and K. E. Routh disclosure OPTIMAL PASSIVE VIBRATION CONTROL OF CUTTING PROCESS STABILITY IN MILLING, dampening uses an optimum control method to suppress chatter, defining an objection function according to milling depth, milling width, and spindle rate to obtain optimum m, c, and k values of a dynamic structure of the damper.

In the Jingchuan Pan, Chun-Yi Su, and Yury Stepanenko disclosure MODELING AND ROBUST ADAPTIVE CONTROL OF METAL CUTTING MECHANICAL SYSTEM, a lathe tool seat uses a robust adaptive control method and regulates a feed amount of the lathe tool using an actuator to change milling thickness for chatter suppression.

As described, many other chatter suppression methods are provided. Current chatter suppression methods, however, cannot detect and suppress chatter occurring immediately, and are thus incapable of improving surface precision. Thus, an effective method for suppressing chatter is desirable.

SUMMARY

Detecting and suppressing control methods for milling tool chatter are provided. In an embodiment of such a method, milling parameters are defined. A milling device is initiated using the milling parameters. Milling signals are extracted using a sensor installed on the milling device. It is determined whether chatter relating to the milling device occurs, comprising determining whether the milling signals are high frequency signals, and, if so, determining whether signal points generated based on the milling signals are located in a stable area derived using a sliding function. If the signal points are located outside the stable area, rotational rates of a spindle of the milling device are adjusted.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The invention can be more fully understood by reading the subsequent detailed description and examples of embodiments thereof with reference made to the accompanying drawings, wherein.

DETAILED DESCRIPTION

Figure 1:
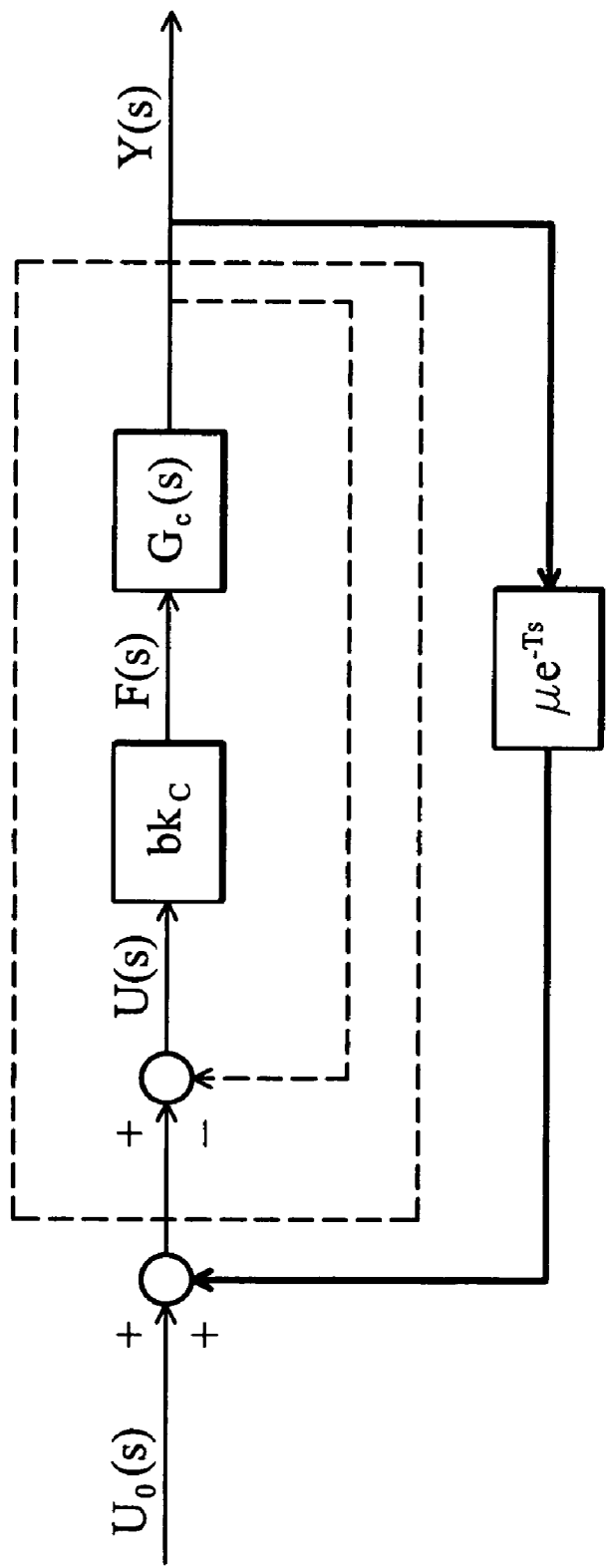
FIG. 1 is a schematic view of an embodiment of an milling system model.

The invention discloses a detecting and suppressing control method for milling tool chatter.

Chatter generated by a machine tool comprises, but is not limited to, forced vibrations and self-excited vibrations. Other type of chatter can further be detected and suppressed using the method of the invention. Conventionally, chatter is determined using Fast Fourier Transformation (FFT), determining whether received voice signals from a sensor are high frequency signals. Such a method is not adapted to milling processes with high rotational rate, low feeding, and less milling depth. Feed rate per edge is far less than a standard value, such that a milling tool idles easily to rub a workpiece repeatedly, generating high frequency friction signals. Erroneous judgments thus occur if chatter is determined using only FFT.

As described, the invention determines, using a sliding function derived by a variable structure system and FFT, whether chatter occurs, and changes rotational rate of a spindle of a machine tool, enabling the spindle to depart from a resonance area for chatter suppression. Additionally, the invention detects and suppresses chatter generated during, but not limited to, a milling process. Practically, chatter generated by turning, reaming, grinding, or drilling can also be detected and suppressed.

In this embodiment of the invention, chatter is generated with determined whether retrieved milling signals generated by oscillation displacement (based on rotational rate or acceleration) during a milling process are high frequency signals and determined whether signal points generated by oscillation displacement (based on rotational rate or acceleration) during a milling process are located in a stable area derived using a sliding function. It is noted that chatter occurs as both the determinations are achieved. Milling signals are obtained by converting oscillation displacement (based on rotational rate or acceleration) retrieved using a sensor during a milling process. The retrieved milling signals are converted to milling frequency for chatter determination.

Determination of whether retrieved milling signals are high frequency signals is implemented using FFT, known and thus omitted in the following for simplicity. Additionally, FFT comprises drawbacks as described above, and thus the invention provides a second determination condition for enhanced accuracy.

Determination of whether signal points generated by oscillation displacement (based on rotational rate or acceleration) during a milling process are located in a stable area is derived using a sliding function as follows.

A milling process generates relative displacement between a milling tool and a workpiece, enabling plastic deformation and separate milling. The milling tool generates milling resistance (i.e. milling force). The milling force degree changes according to processing methods, milling tool quality, milling conditions (such as rotational rate of a spindle, feed rate, axial milling depth, radial depth, and so forth), workpiece materials and uniformity. A milling processing system is complicated and non-linear, so as a result, a system model must be simplified and linearised whereby a milling system model is obtained according to non-deformed milling thickness. If dynamic milling force is ignored, the relationship between milling force and non-deformed milling thickness may be in direct proportion, represented as:

$$F(t) = bk_c u(t) \quad (1),$$

where F(t) represents milling force, b represents axial milling depth, $k_c$ represents milling resistance coefficient, and u(t) represents non-deformed milling thickness.

If average milling depth is twice oscillation displacement, the non-deformed milling thickness can be represented as:

$$u(t) = u_0(t) - [y(t) - \mu y(t-T)] \quad (2),$$

where u(t) represents transient non-deformed milling thickness, $u_0$ represents average milling thickness, μ represents an overlapping factor and $0 \leq \mu \leq 1$ (indicating an overlapping degree of the front and rear oscillation ripples), and y(t) represents oscillation displacement of a workpiece. The formula is then converted using Laplace transform, represented as:

$$u(s) = u_0(s) - [y(s) - \mu e^{-Ts} y(s)] \quad (3).$$

Milling force acts on a workpiece to result in oscillation displacement between a milling tool of a spindle and the workpiece. If a system transfer function of a machine tool can represent a second order system, the function is represented as:

$$m\ddot{y}(t) + c\dot{y}(t) + ky(t) = F(t) \quad (4),$$

where F(t) represents milling force, y(t) represents oscillation displacement, and m, c, and k represent mass, a damped coefficient, and a elasticity coefficient, respectively, relating to a machine tool. Next, the formula is converted using Laplace transform, represented as:

$$ms^2 y(s) + csy(s) + ky(s) = F(s) \quad (5).$$

Next, a formula is obtained according to formula (5), represented as:

$$\frac{y(s)}{F(s)} = \frac{1}{ms^2 + cs + k} = G_c(s). \quad (6)$$

Next, F(s) is substituted for formula (1), represented as:

$$\frac{y(s)}{u(s)} = bk_c G_c(s). \quad (7)$$

A milling system model of an embodiment of the invention can thus be generated according to formulas (6) and (7), as shown in FIG. 1, in which the dotted line represents a primary feedback operation and the bold line represents a regenerative feedback operation.

Next, milling force and oscillation displacement generated during a milling process using a machine act as inputs and outputs for system identification, utilizing milling condition settings to obtain a system transfer function.

Milling conditions (such as rotational rate of a spindle or feed rate) cannot be arbitrarily determined, or milling load per edge of a milling tool may be excessively large or small. Excessively large milling load can burst milling tools or oscillation while excessive small milling load cannot properly utilize structural characteristics of a machine tool. As a result, the relationship between rotational rate of a spindle and oscillation displacement is obtained according to average milling thickness and feed amount per edge.

Milling conditions, for example, comprise milling width of 6 (mm), milling depth of 2 (mm), and average milling thickness of 0.017 (mm).

A simultaneous formula of the relationship between rotational rate of a spindle and feed rate is represented as:

$$t_{avg} = \frac{2}{\pi} \cdot f_t, \quad (8)$$

$$f_t = \frac{\pi}{2} \cdot t_{avg}, \text{ and} \quad (9)$$

$$F = f_t \cdot N \cdot Z, \quad (10)$$

where $t_{avg}$ represents non-deformed milling thickness, $f_t$ represents feed amount per edge (mm/tooth) relating to a milling tool, N represents rotational rate (RPM) of a spindle, Z represents the number of milling edges, and F represents feed rate (mm/min).

Formula (8) represents the relationship between non-deformed milling thickness and feed amount per edge. Next, a value of $t_{avg}$ is determined and substituted for formula (9) for feed amount per edge of a milling tool. Formula (10) represents the relationship between rotational rate of a spindle and feed rate based on fixed non-deformed milling thickness, obtaining milling parameters for system identification. Thus, a system transfer function of a machine tool is obtained, represented as:

$$G(s) = \frac{Y(s)}{F(s)} \quad (11)$$
$$= \frac{0.0936s^3 + 313.4s^2 + 7.191*10^5 s + 5.111*10^8}{s^4 + 3236s^3 + 1.467*10^7 s^2 + 2.303*10^{10} s + 3.115*10^{13}},$$

where G(s) represents a system transfer function, F(s) represents system inputs (i.e. milling force (N)), and Y(s) represents system outputs (i.e. oscillation displacement (mm)).

Figure 2:
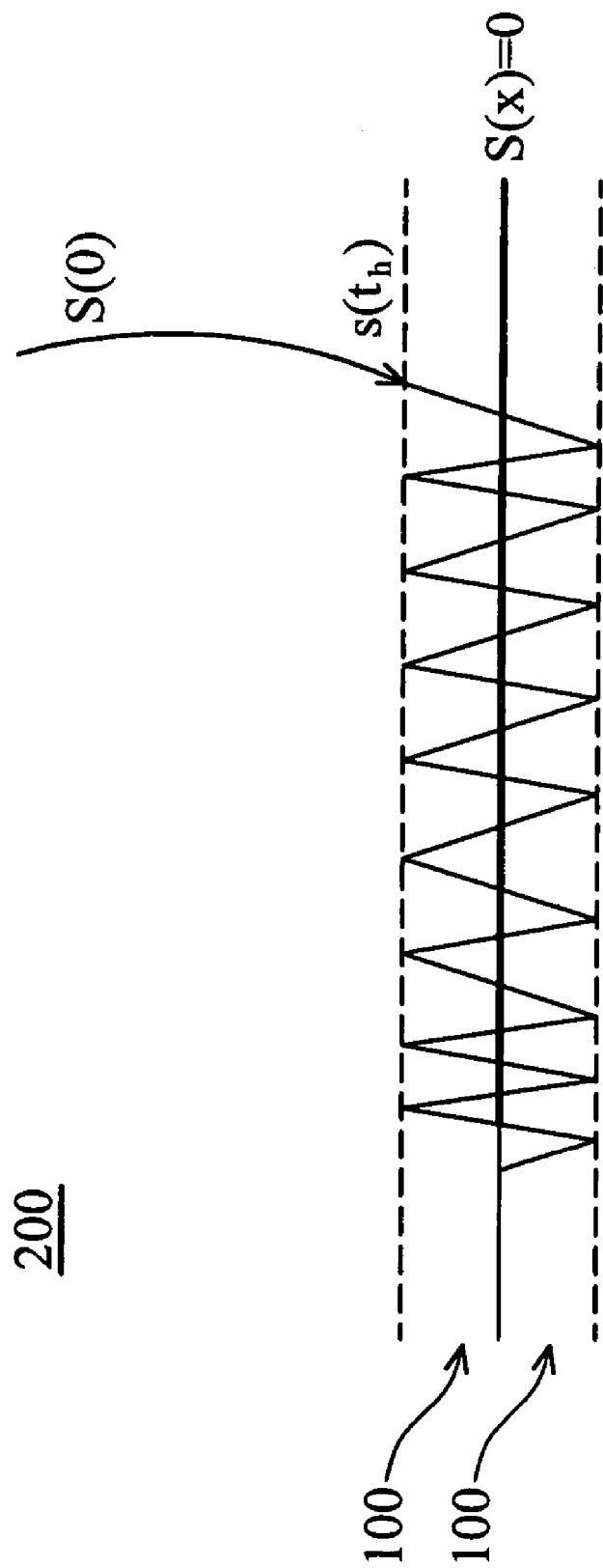
FIG. 2 is a schematic view of an embodiment of a sliding layer generated using a sliding function.

Referring to FIG. 2, a sliding surface S(x) is designed under the variable structure control, enabling sub-system switch and a milling system with respect to the sliding surface S(x) to reach a target zero point according to the sliding surface. During a sliding process, if a milling system departs from the sliding surface due to external force or other causes, it is forced to be slid back to the sliding surface utilizing sub-system switch. According to such characteristics, a phase may comprise a stable area and an unstable area. In stable area 100, the milling system is convergent but divergent. Unstable area 200 is outside stable area 100. The milling system may be divergent if it departs from stable area 100 to unstable area 200 with incapability of being slid back. Milling signals are continuously periodic signals, if chatter does not occur during a milling process, a milling system periodically runs in stable area 100, and, if chatter occurs, the milling system is convergent on a phase plan, thus determining whether chatter occurs accordingly.

A sliding surface can be derived from matrix transformation, feature structure assignment, Lyapunov theorem, pole placement, and so forth. In this embodiment, the sliding surface S(x) is derived from Lyapunov theorem.

As described, a system transfer function of a machine tool is represented as:

$$G(s) = \frac{Y(s)}{F(s)} \quad (12)$$

-continued
$$= \frac{0.0936s^3 + 313.4s^2 + 7.191*10^5 s + 5.111*10^8}{s^4 + 3236s^3 + 1.467*10^7 s^2 + 2.303*10^{10} s + 3.115*10^{13}}$$

where F(s) represents system inputs (i.e. milling force (N)) and Y(s) represents system outputs (i.e. oscillation displacement (mm)).

A transfer function of a machine tool is defined, represented as:

$$G(s) = \frac{Y(s)}{F(s)} = \frac{a_1 s^3 + a_2 s^2 + a_3 s + a_4}{s^4 + b_1 s^3 + b_2 s^2 + b_3 s + b_4}, \quad (13)$$

rewritten as:

$$G(s) = \frac{Y(s)}{F(s)} = \frac{a_1 s^3 + a_2 s^2 + a_3 s + a_4}{s^4 + b_1 s^3 + b_2 s^2 + b_3 s + b_4} * \frac{N(s)}{N(s)}, \quad (14)$$

where N(s) represents an auxiliary state function, converted and represented as:

$$\begin{bmatrix} \dot{x}_1 \\ \dot{x}_2 \\ \dot{x}_3 \\ x_4^{(4)} \end{bmatrix} = \begin{bmatrix} 0 & 1 & 0 & 0 \\ 0 & 0 & 1 & 0 \\ 0 & 0 & 0 & 1 \\ -b_4 & -b_3 & -b_2 & -b_1 \end{bmatrix} \begin{bmatrix} x_1 \\ x_2 \\ x_3 \\ x_4 \end{bmatrix} + \begin{bmatrix} 0 \\ 0 \\ 0 \\ 1 \end{bmatrix} u \quad (15)$$

$$y = [a_4 \; a_3 \; a_2 \; a_1] \begin{bmatrix} x_1 \\ x_2 \\ x_3 \\ x_4 \end{bmatrix}.$$

Next, a sliding formula is obtained using Lyapunor theorem, represented as:

$$s = cx = B^T P x = \begin{bmatrix} 0 \\ 0 \\ 0 \\ 1 \end{bmatrix}^T \begin{bmatrix} p_1 & p_2 & p_3 & p_4 \\ p_5 & p_6 & p_7 & p_8 \\ p_9 & p_{10} & p_{11} & p_{12} \\ p_{13} & p_{14} & p_{15} & p_{16} \end{bmatrix} \begin{bmatrix} x_1 \\ x_2 \\ x_3 \\ x_4 \end{bmatrix} \quad (16)$$

$$= [p_{13} \; p_{14} \; p_{15} \; p_{16}] \begin{bmatrix} x_1 \\ x_2 \\ x_3 \\ x_4 \end{bmatrix}.$$

Next, $p_{13}$, $p_{14}$, $p_{15}$, and $p_{16}$ are thus obtained, represented as:

$$p_{13} = -\frac{1}{2b_4} \quad (17)$$

$$p_{14} = -\frac{-b_1 b_2^2 + b_2 b_3 + b_1 b_4 - b_1 b_2 b_4 + b_3 b_4 - b_1 b_4^2 - b_3 b_4^2}{2b_4(-b_1 b_2 b_3 + b_3^2 + b_1^2 b_4)}$$

$$p_{15} = -\frac{-b_1^2 b_2 + b_1 b_3 - b_1^2 b_4 - b_1 b_3 b_4 + b_3^2 b_4}{2b_4(-b_1 b_2 b_3 + b_3^2 + b_1^2 b_4)}$$

-continued $$p_{16} = -\frac{-b_1b_2b_4 + b_3 - b_1b_4 - b_3b_4 + b_2b_3b_4 - b_1b_4^2}{2b_4(-b_1b_2b_3 + b_3^2 + b_1^2b_4)}.$$

Next, formulas (12) and (17) are substituted for formula (16), represented as:

$$s = cx = B^T Px = [p_{13} \quad p_{14} \quad p_{15} \quad p_{16}] \begin{bmatrix} x_1 \\ x_2 \\ x_3 \\ x_4 \end{bmatrix} = \quad (18)$$

$$\begin{bmatrix} -\frac{1}{2b_4} \\ -\frac{-b_1b_2^2 + b_2b_3 + b_1b_4 - b_1b_2b_4 + b_3b_4 - b_1b_4^2 - b_3b_4^2}{2b_4(-b_1b_2b_3 + b_3^2 + b_1^2b_4)} \\ -\frac{-b_1^2b_2 + b_1b_3 - b_1^2b_4 - b_1b_3b_4 + b_3^2b_4}{2b_4(-b_1b_2b_3 + b_3^2 + b_1^2b_4)} \\ -\frac{-b_1b_2b_4 + b_3 - b_1b_4 - b_3b_4 + b_2b_3b_4 - b_1b_4^2}{2b_4(-b_1b_2b_3 + b_3^2 + b_1^2b_4)} \end{bmatrix}^T \begin{bmatrix} x_1 \\ x_2 \\ x_3 \\ x_4 \end{bmatrix} =$$

$$[-1.60514*10^{-14} \quad -1515.33 \quad 1.1202 \quad -0.000500718] \begin{bmatrix} x_1 \\ x_2 \\ x_3 \\ x_4 \end{bmatrix}.$$

Thus, sliding function can be represented as:

$$s(x) = -1.60514*10^{-14}x_1 - 1515.33x_2 + 1.1202x_3 - 0.000500718x_4 \quad (19),$$

where $x_1$ represents oscillation displacement, $x_2$ represents a first order differential of $x_1$, $x_3$ represents a second order differential of $x_1$, and $x_4$ represents a fourth order differential of $x_1$.

Figure 3:
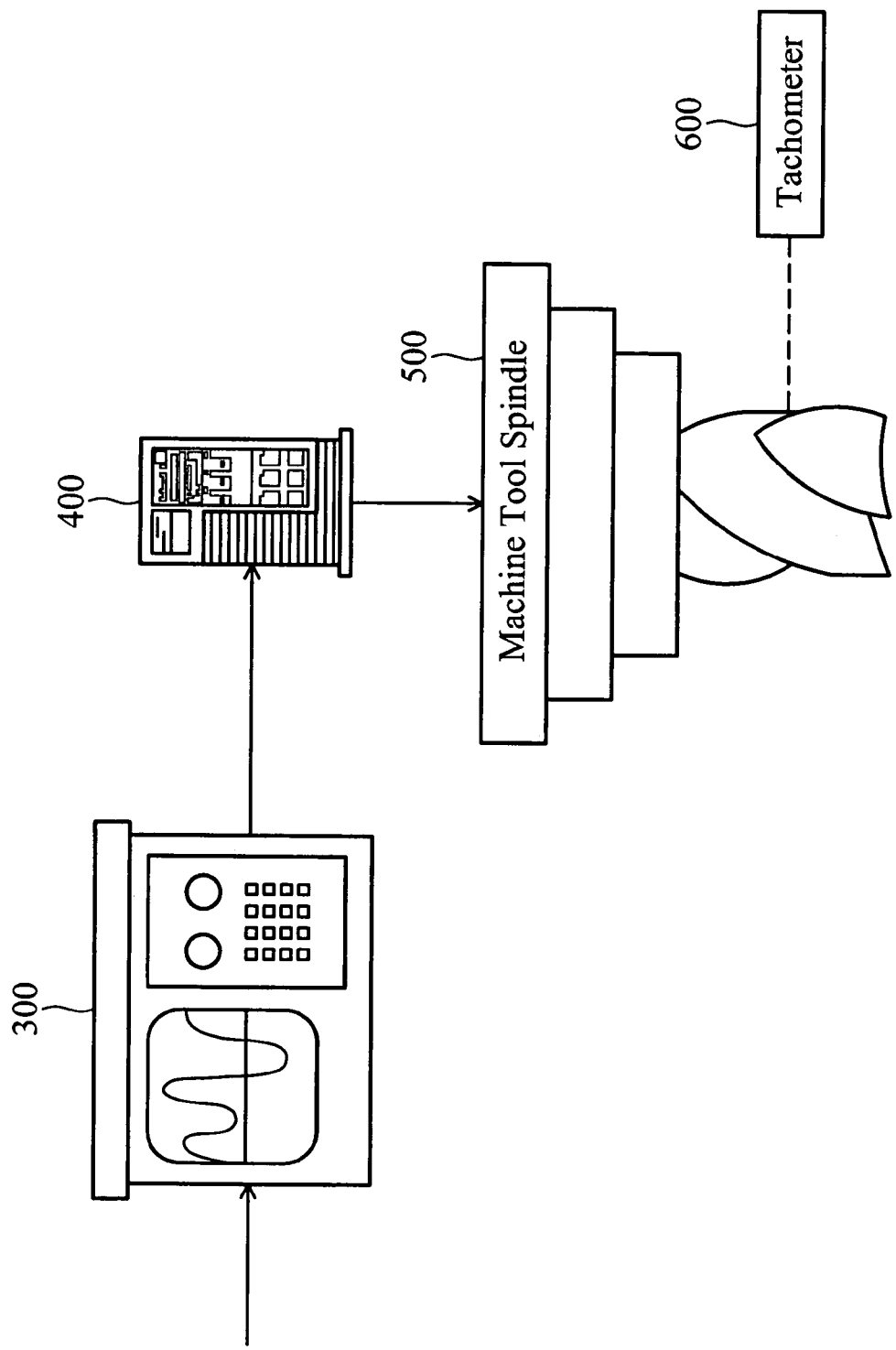
FIG. 3 is a schematic view of an embodiment of the structure of a detecting and suppressing control system.
Figure 4:
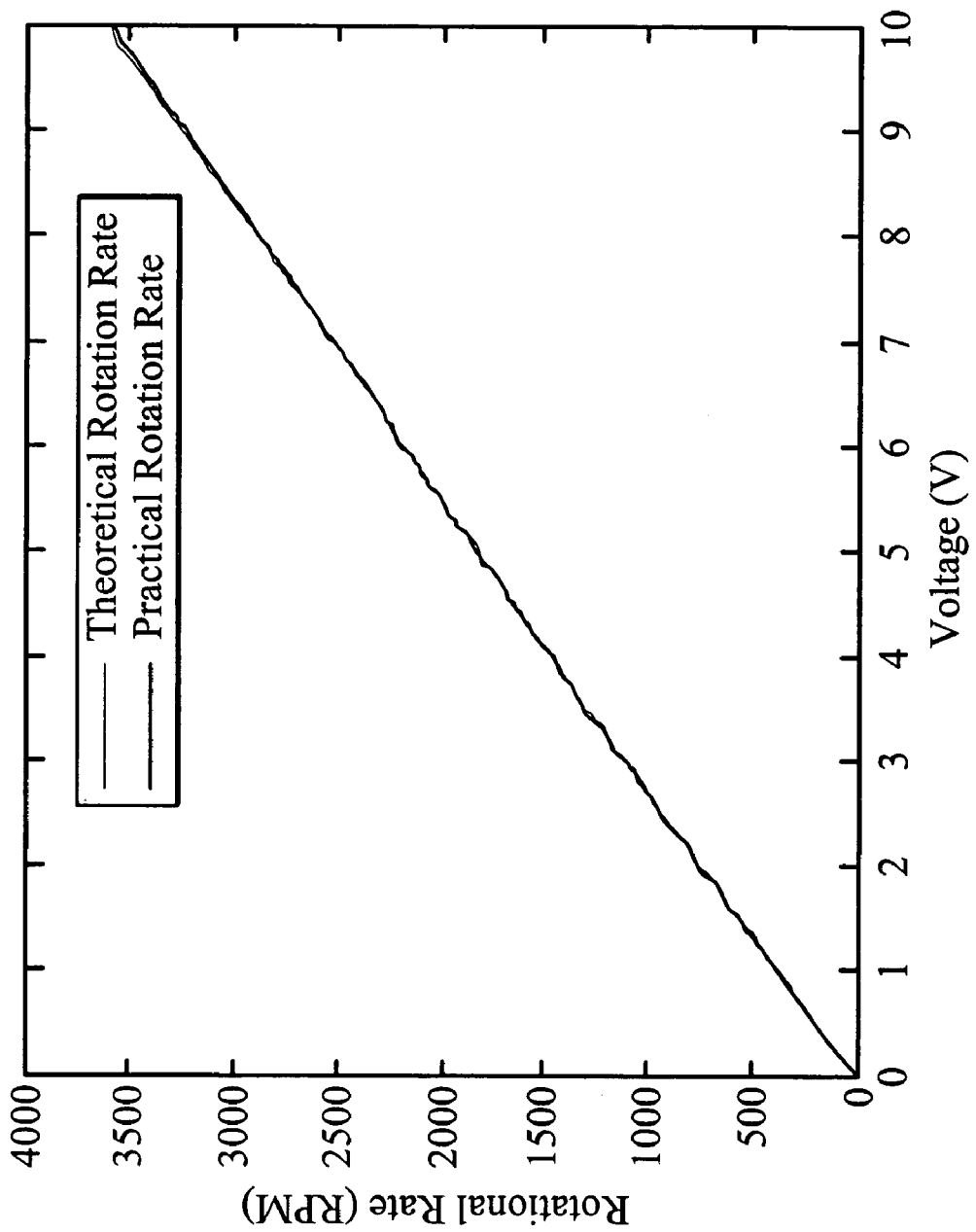
FIG. 4 is a schematic view of an embodiment of comparison between voltage and rotational rates relating to theoretical and practical rotation rates.

The invention suppresses chatter by changing rotational rate of a spindle. A controller of a machine tool is an enclosed computer device, incapable of modifying milling parameters in activation. To modify rotational rate of a spindle immediately, the rotational rate is directly modified using a converter. Referring to FIG. 3, controller 300 inputs rotational rate to converter 400 and spindle 500 retrieves control voltage of from converter 400. Rotational rate of spindle 500 comprises theoretical and practical rotational rates. The theoretical rotational rate is determined by input rotational rate while practical rotational rate is obtained by measuring spindle 500 using tachometer 600. Linear relations relating to rotational rate of a spindle are obtained using curve fitting, represented as:

$$y = 360.5095x + 13.06 \quad (20), \text{ and}$$

$$z = 358.5026x + 21.2539 \quad (21)$$

where X represents control voltage (V), Y represents theoretical rotational rate (RPM) of a spindle, and Z represents practical rotational rate (RPM) of a spindle. Comparison between voltage and rotational rate relating to theoretical and practical rotation rates is shown in FIG. 4.

Figure 5:
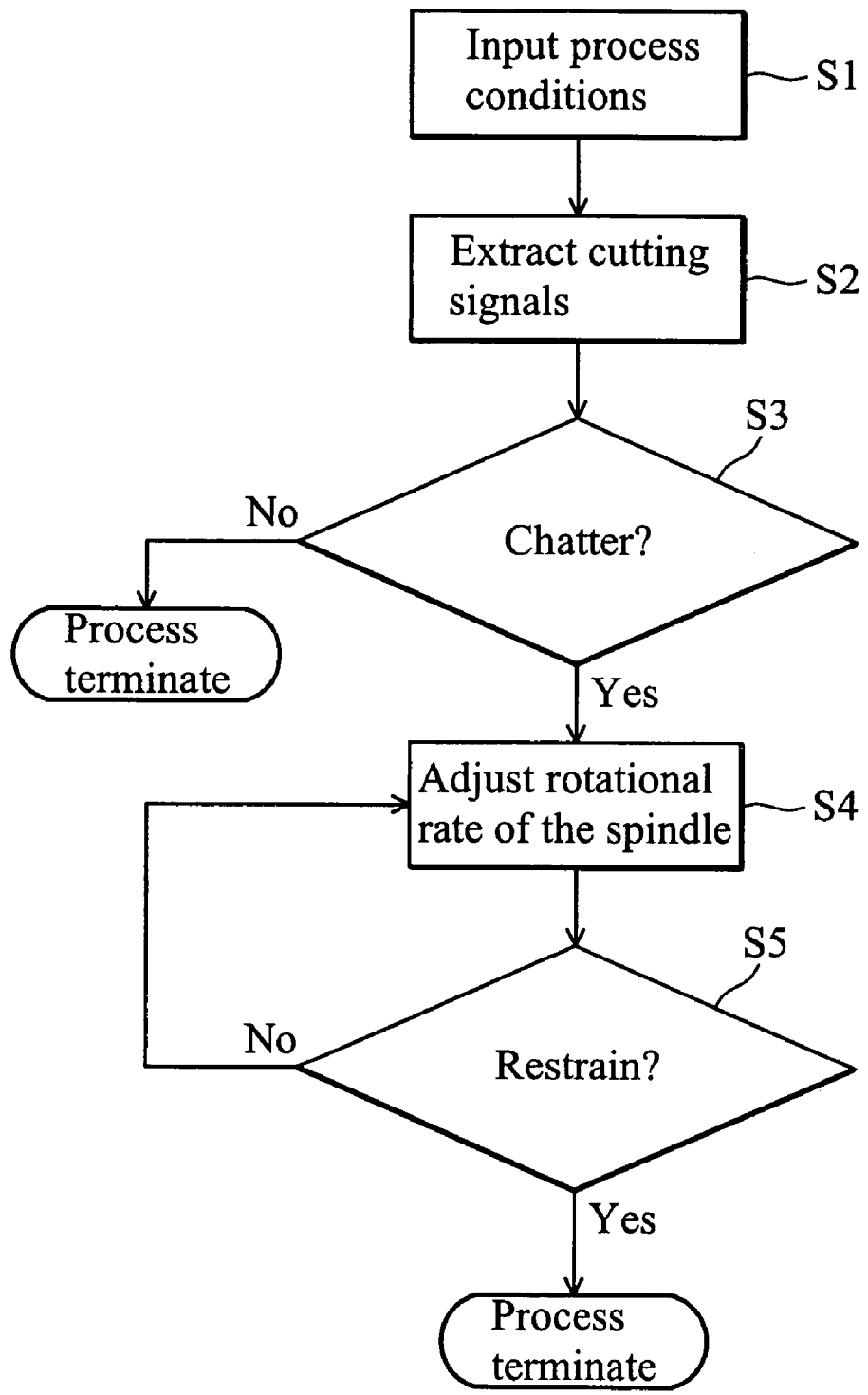
FIG. 5 is a flowchart of an embodiment of the detecting and suppressing control method for milling tool chatter.
Figure 6:
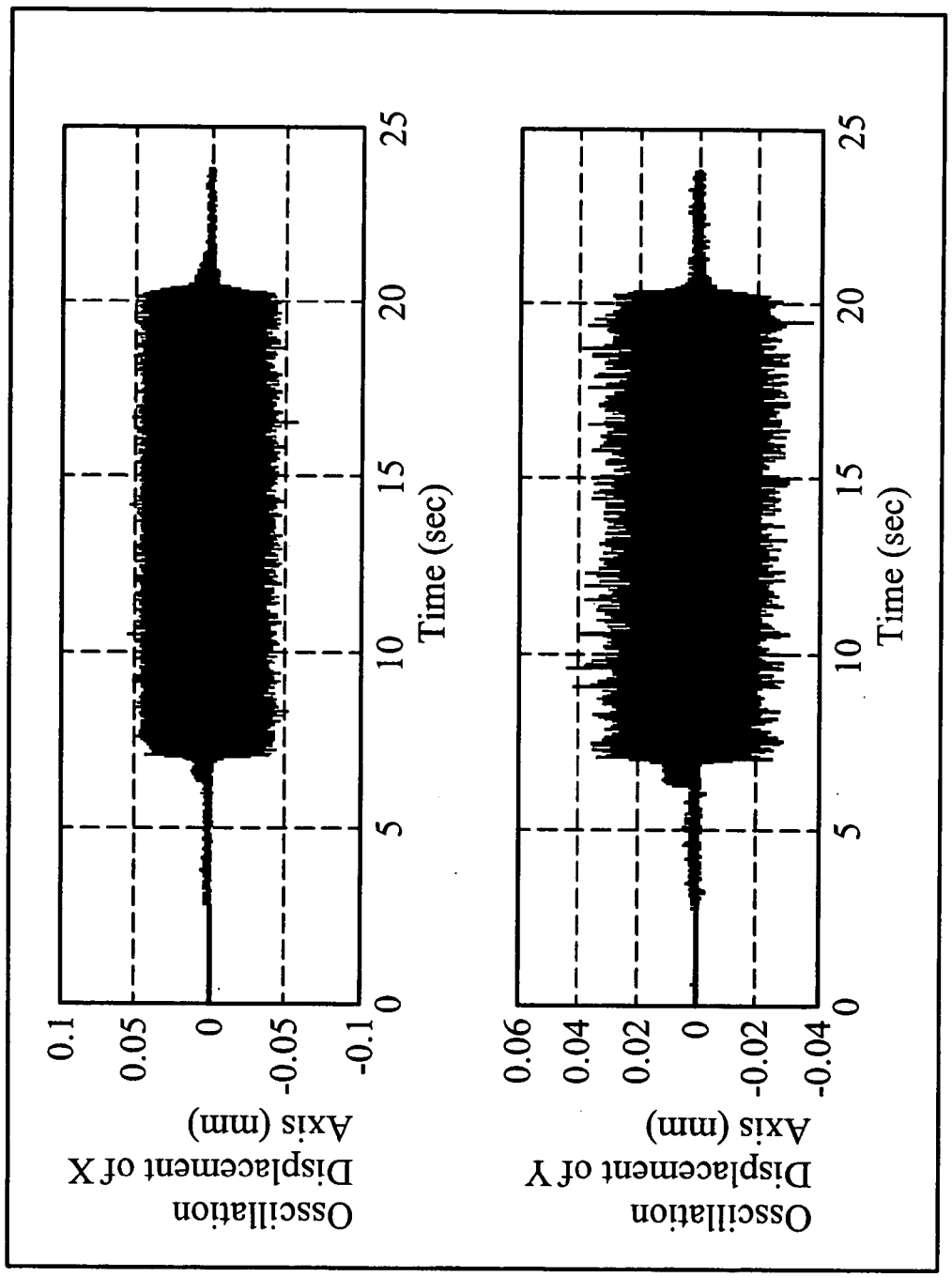
FIG. 6 is a schematic view of an embodiment of the relationship between time and displacement relating to X and Y-axes of a spindle with charter occurrence.
Figure 7:
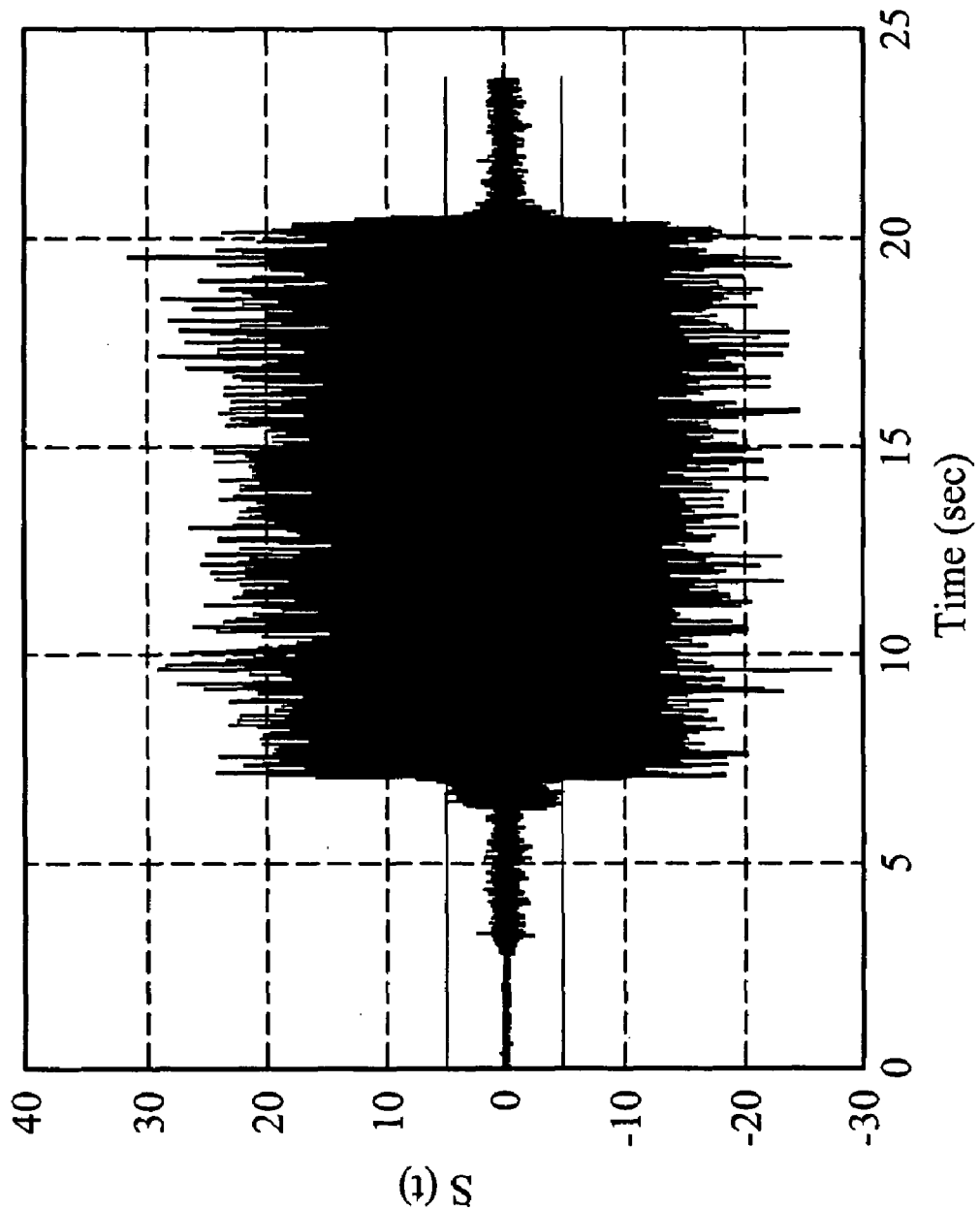
FIG. 7 is a schematic view of the relationship between time and a sliding function based on oscillation displacement with charter occurrence.
Figure 8:
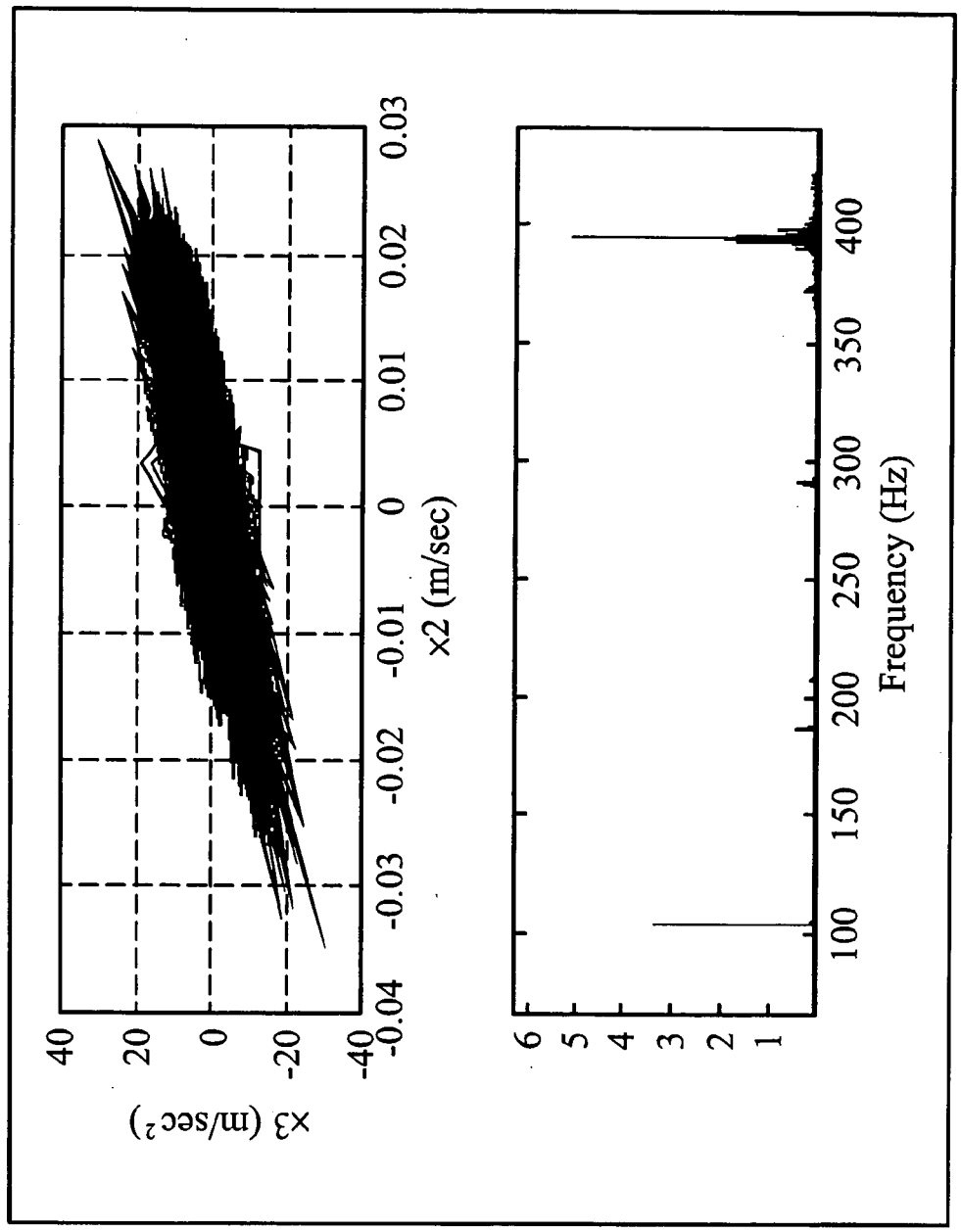
FIG. 8 is a schematic view of an embodiment of a phase plan and oscillation frequency spectra relating to X and Y-axes of a spindle with charter occurrence.
Figure 9:
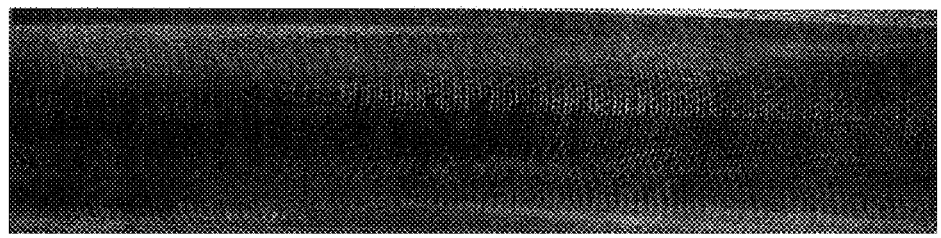
FIG. 9 is a schematic view of an embodiment of surface precision of a milled workpiece with charter occurrence.
Figure 10:
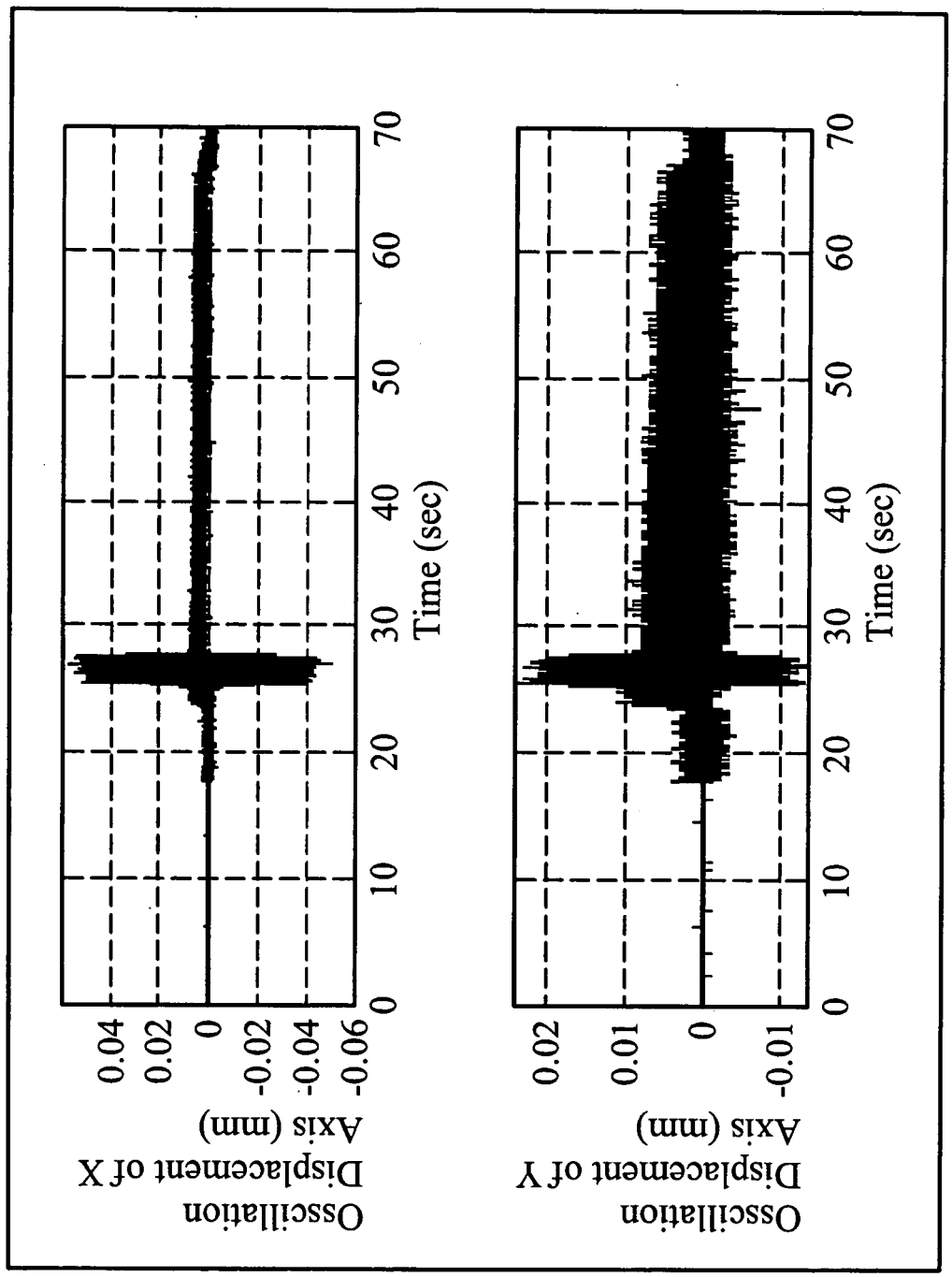
FIG. 10 is a schematic view of the relationship between time and displacement relating to X and Y-axes of a spindle with rotational rate reduction for chatter suppression.
Figure 11:
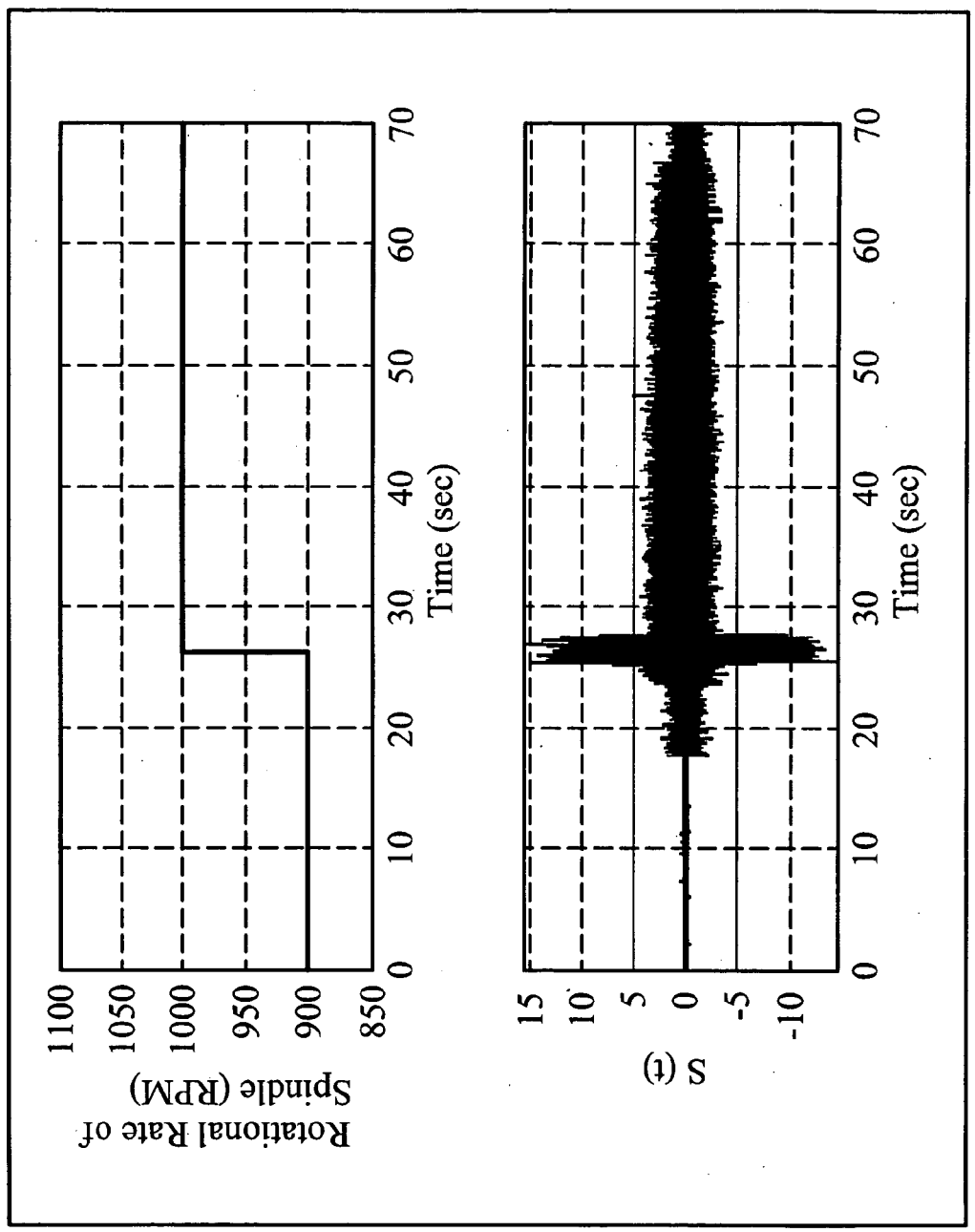
FIG. 11 is a schematic view of the relationship between time and a sliding function based on oscillation displacement with rotational rate reduction for chatter suppression.
Figure 12:
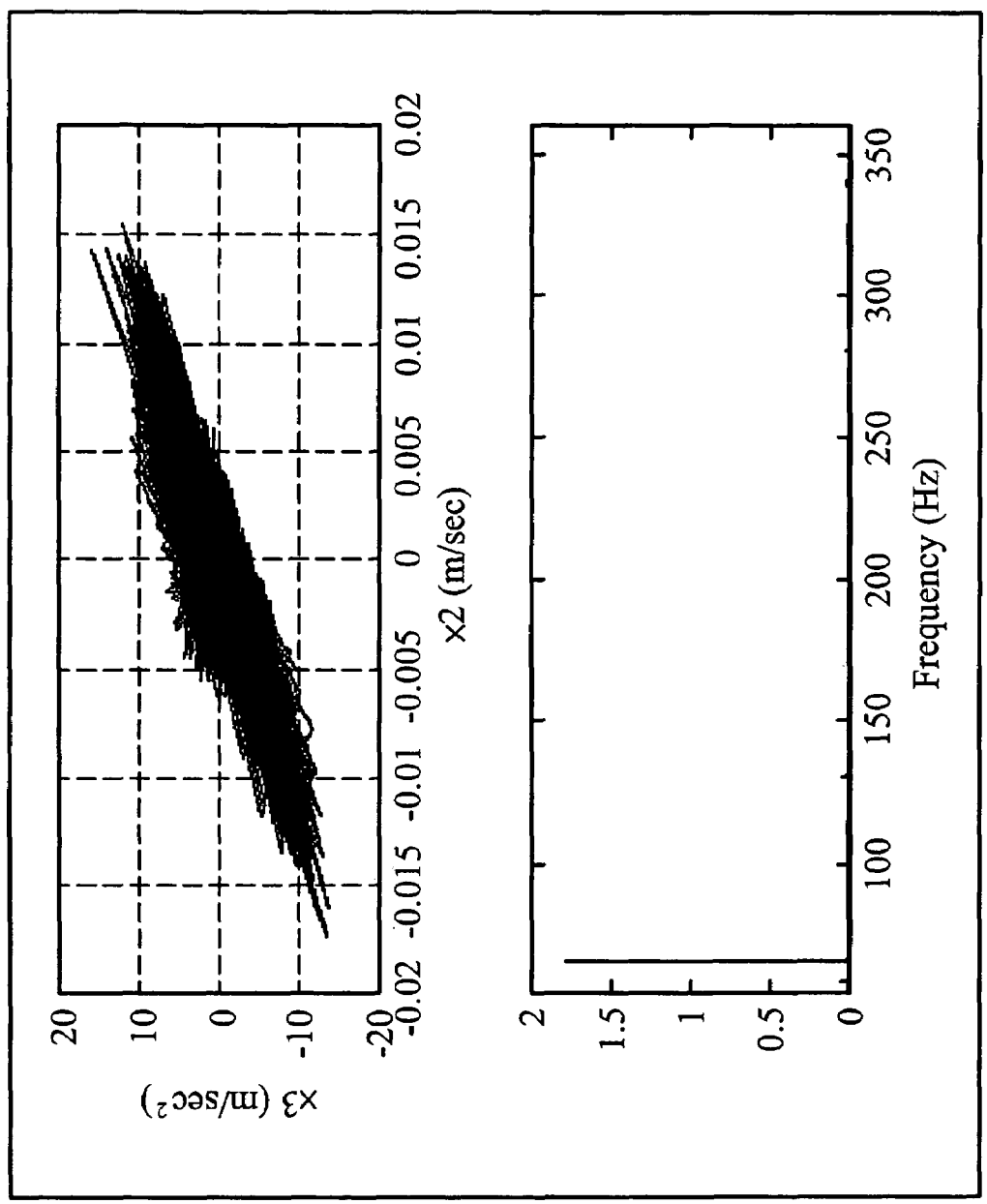
FIG. 12 is a schematic view of an embodiment of a phase plan and oscillation frequency spectra relating to X and Y axes of a spindle with rotational rate reduction for chatter suppression.
Figure 13:
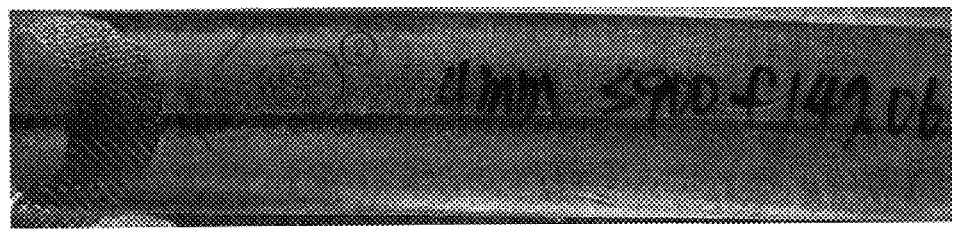
FIG. 13 is a schematic view of an embodiment of surface precision of a milled workpiece with rotational rate reduction for chatter suppression.
Figure 14:
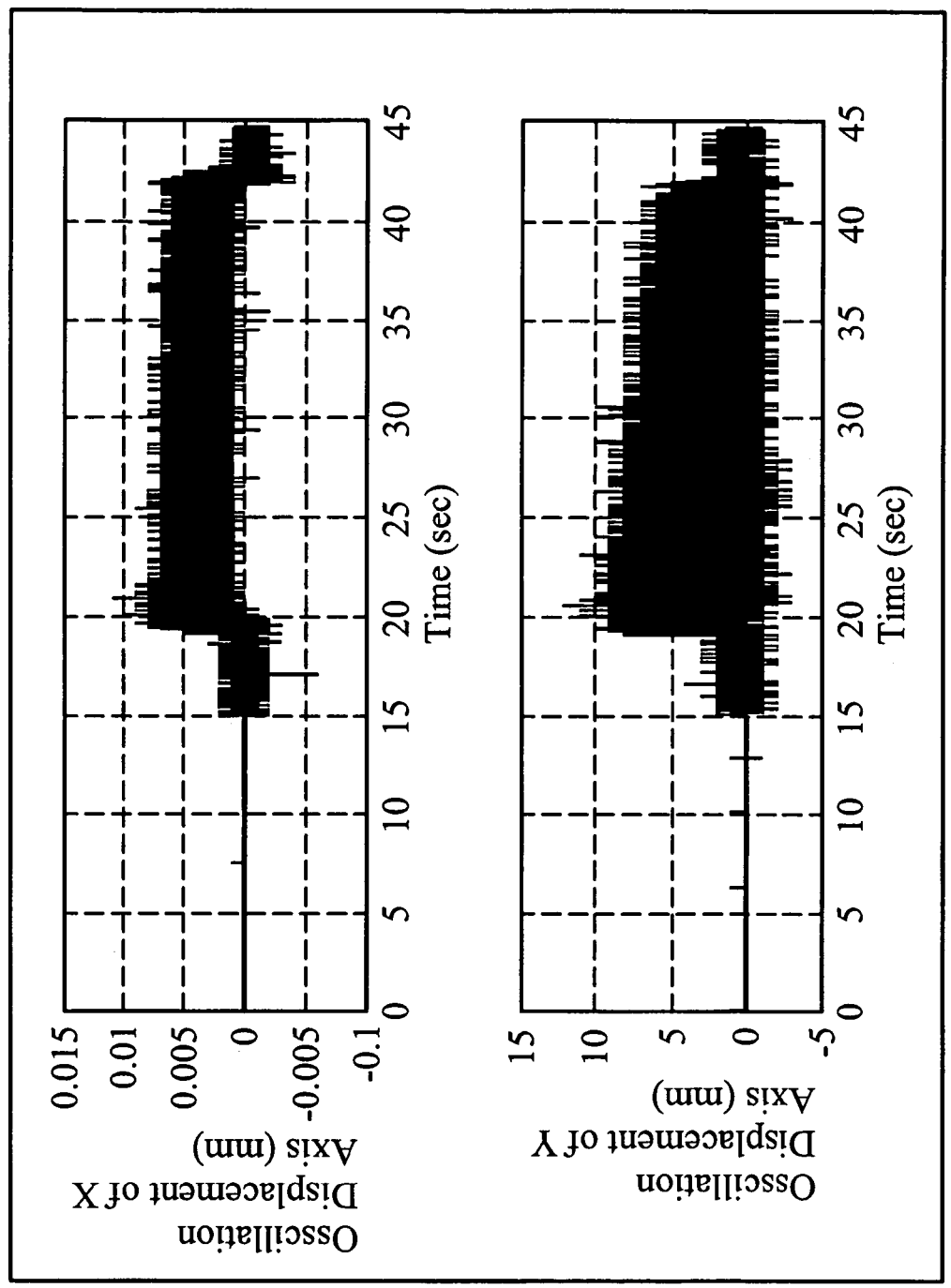
FIG. 14 is a schematic view of the relationship between time and displacement relating to X and Y-axes of a spindle with rotational rate increase for chatter suppression.
Figure 15:
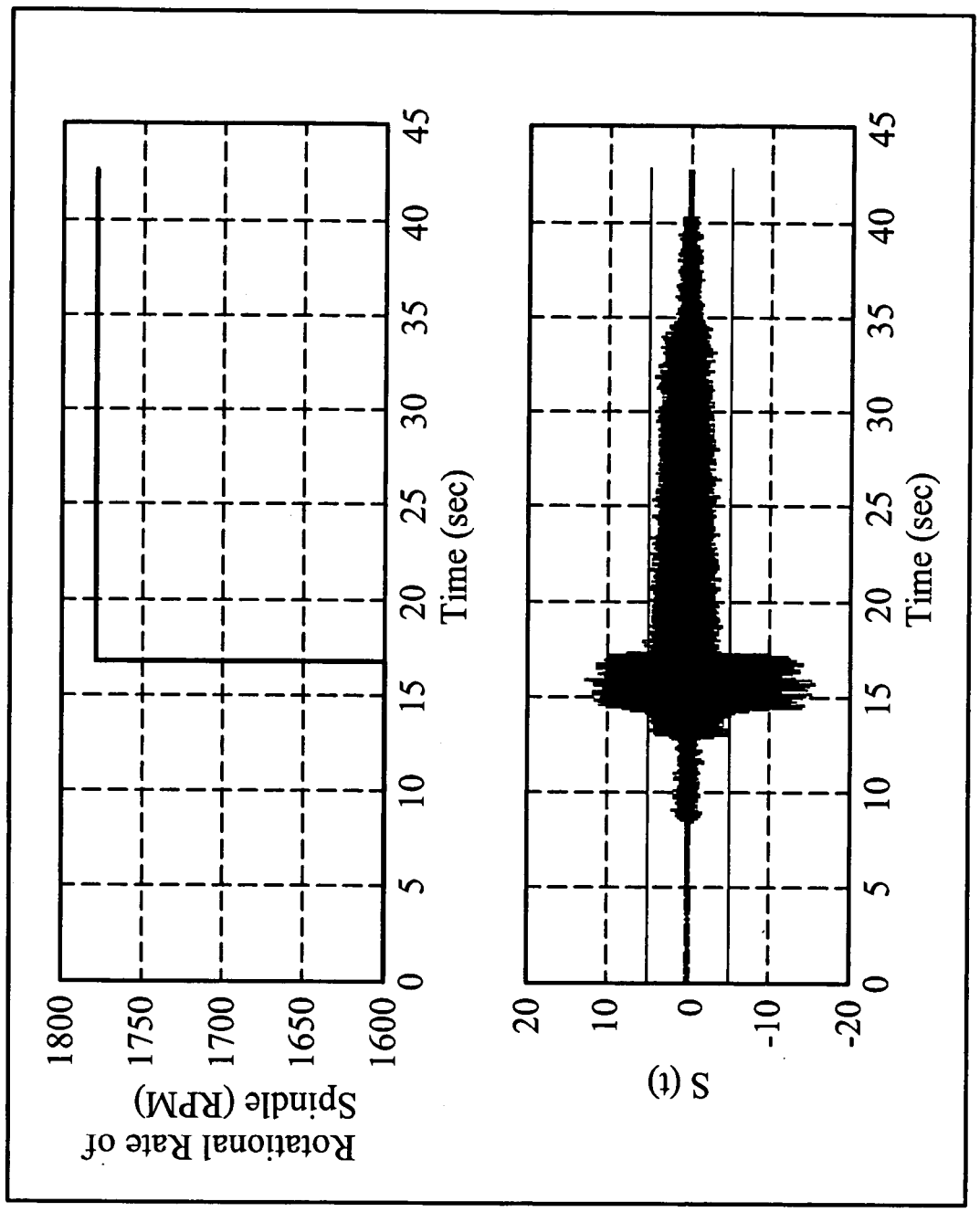
FIG. 15 is a schematic view of the relationship between time and a sliding function based on oscillation displacement with rotational rate increase for chatter suppression.
Figure 16:
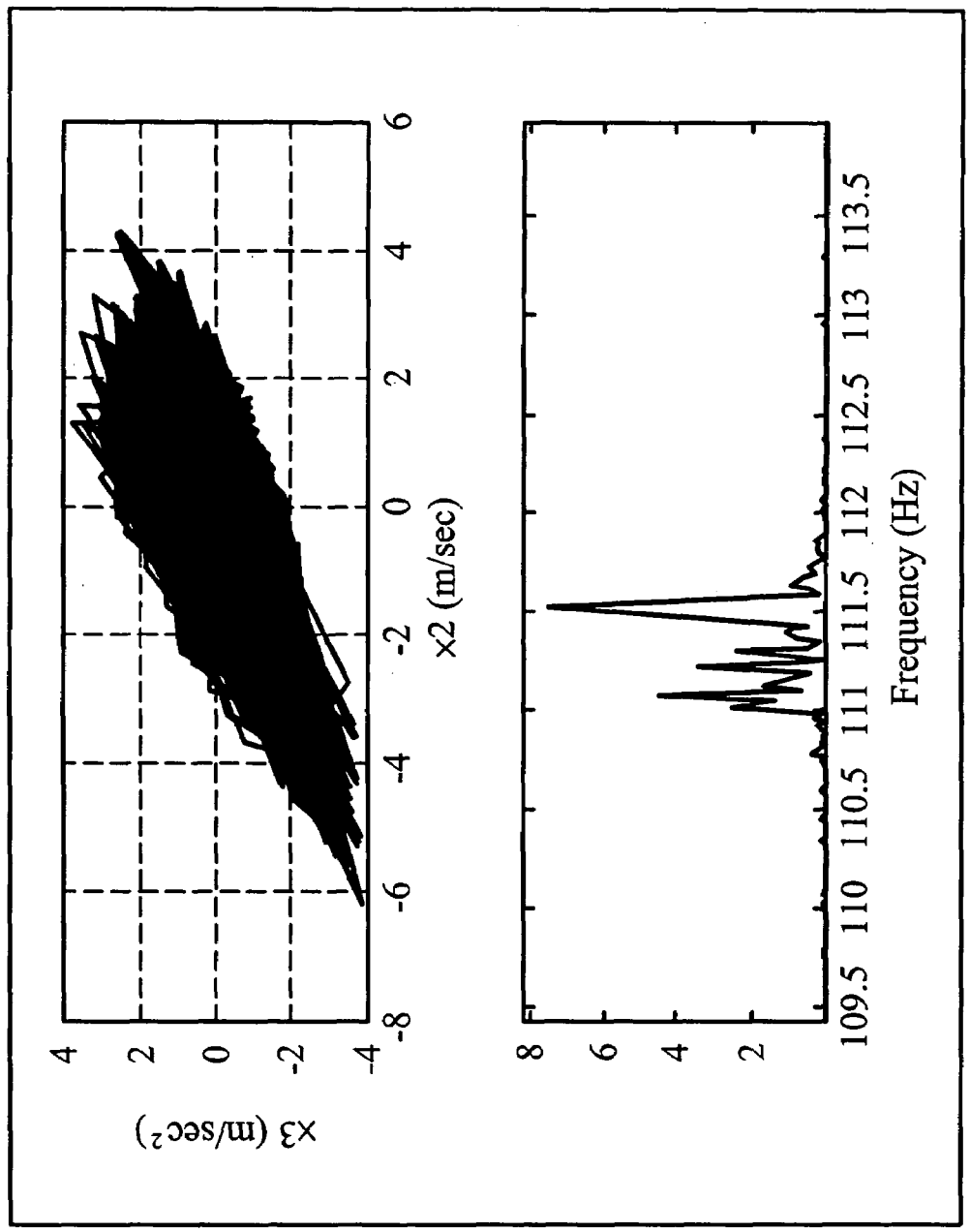
FIG. 16 is a schematic view of an embodiment of a phase plan and oscillation frequency spectra relating to X and Y axes of a spindle with rotational rate increase for chatter suppression.
Figure 17:
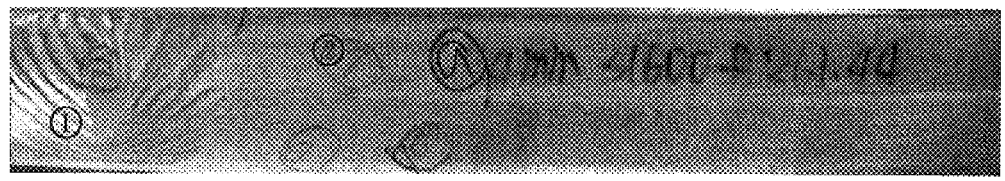
FIG. 17 is a schematic view of an embodiment of surface precision of a milled workpiece with rotational rate increase for chatter suppression.

FIG. 5 is a flowchart of an embodiment of the detecting and suppressing control method for milling tool chatter. Milling parameters relating to a spindle of a machine tool are first defined and input to the machine tool (step S1). The machine tool is initiated using the milling parameters and begins milling the workpiece. Milling signals generated with oscillation displacement relating to the spindle occurring during a milling process are detected and extracted using a sensor installed on the machine tool (step S2). Next, it is determined whether chatter relating to the machine tool occurs, comprising determining whether the milling signals are high frequency signals, and, if so, determining whether signal points generated based on the milling signals are located in a stable area derived using a sliding function (step S3). If chatter occurs, the process proceeds to step S4, and, if not, the process terminates.

If chatter occurs, a chatter suppression system is initiated, enabling a converter to change rotational rate of the spindle (step S4), a control formula thereof represented as:

$$N_{new} = N*P \quad (22)$$

where N represents rotational rate (RPM) of a spindle, P represents desired percentage of rotational rate, and $N_{new}$ represents adjusted rotational rate (RPM) of a spindle.

It is determined whether chatter are suppressed (step S5). If so, the process terminates, and, if not, the process goes to step S4.

The following milling experiments identify chatter suppression.

Default milling conditions comprise milling depth of 4 (mm), milling width of 6 (mm), rotational rate of a spindle of 1150 (RPM), and feed rate of 187.91 (mm/min). As a result, X and Y axial displacements of a spindle, generated sliding function values, a phase plan and corresponding oscillation frequency of the Y axis, and surface precision of a milled workpiece are shown in FIGS. 6~9 respectively. Surface precision values of the milled workpiece are shown in Table 1.

TABLE 1

| Ra | Ry | Rz |
|---|---|---|
| 6.11 μm | 30.79 μm | 28.86 μm |

Milling conditions for rate reduction to suppress chatter comprise milling depth of 4 (mm), milling width of 6 (mm), rotational rate of a spindle of 900 (RPM), and feed rate of 147.06 (mm/min). As a result, X and Y axial displacements of a spindle, generated sliding function values, a phase plan and corresponding oscillation frequency of the Y axis, and surface precision of a milled workpiece are shown in FIGS. 10~13 respectively. Surface precision values of the milled workpiece are shown in Table 2.

TABLE 2

| Suppression | Ra | Ry | Rz |
|---|---|---|---|
| Before | 4.68 μm | 22.96 μm | 22.96 μm |
| After | 0.82 μm | 5.83 μm | 5.05 μm |

Milling conditions for rate increase to suppress chatter comprise milling depth of 4 (mm), milling width of 6 (mm), rotational rate of a spindle of 1600 (RPM), and feed rate of 26.144 (mm/min). As a result, X and Y axial displacements of a spindle, generated sliding function values, a phase plan and corresponding oscillation frequency of the Y axis, and surface precision of a milled workpiece are shown in FIGS. 14~17 respectively. Surface precision values of the milled workpiece are shown in Table 3.

TABLE 3

| Suppression | Ra | Ry | Rz |
|---|---|---|---|
| Before | 2.79 μm | 17.15 μm | 17.15 μm |
| After | 0.91 μm | 7.69 μm | 6.11 μm |

As described, milling chatter affects surface precision of a workpiece. Based on X and Y axial displacements, sliding function values, surface precision values, and surface precision shown in FIGS. 9, 13, and 17, when chatter occurs, the surface precision value of Ra is 2~6. After the chatter is suppressed, the surface precision value of Ra is 0.82~1, resulting in great improvement.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A detecting and suppressing control method for milling tool chatter applied to a milling device, comprising:
   defining milling parameters;
   initiating the milling device using the milling parameters;
   extracting milling signals using a sensor installed on the milling device;
   determining whether chatter relating to the milling device occurs, comprising:
      determining whether the milling signals are high frequency signals; and
      if the milling signals are high frequency signals, determining whether signal points generated based on the milling signals are located in a stable area derived using a sliding function; and
   if the signal points are located outside the stable area, adjusting rotational rates of a spindle of the milling device.

2. The detecting and suppressing control method for milling tool chatter as claimed in claim 1, wherein signal extraction further comprises the sensor extracting the milling signals generated according to vibration displacement caused by resonance of the spindle.

3. The detecting and suppressing control method for milling tool chatter as claimed in claim 2, wherein the vibration displacement represents rotational rate or acceleration.

4. The detecting and suppressing control method for milling tool chatter as claimed in claim 1, wherein rate adjustment further comprises controlling a converter to decrease or increase the rotational rate of the spindle.

5. The detecting and suppressing control method for milling tool chatter as claimed in claim 1, further comprising:
   after rate adjustment is implemented, determining whether the chatter is suppressed;
   if the chatter is suppressed, executing the determination according to the milling signals; and
   if chatter remains, re-adjusting the rotational rates of the spindle of the milling device.

6. A storage medium storing a computer program providing a detecting and suppressing control method for milling tool chatter, comprising using a computer to perform the steps of:
   defining milling parameters;
   initiating the milling device using the milling parameters;
   extracting milling signals using a sensor installed on the milling device;
   determining whether chatter relating to the milling device occurs, comprising:
      determining whether the milling signals are high frequency signals; and
      if the milling signals are high frequency signals, determining whether signal points generated based on the milling signals are located in a stable area derived using a sliding function; and
   if the signal points are located outside the stable area, adjusting rotational rates of a spindle of the milling device.

7. The storage medium as claimed in claim 6, wherein signal extraction further comprises the sensor extracting the milling signals generated according to vibration displacement caused by resonance of the spindle.

8. The storage medium as claimed in claim 7, wherein the vibration displacement represents rotational rate or acceleration.

9. The storage medium as claimed in claim 6, wherein rate adjustment further comprises controlling a converter to decrease or increase the rotational rate of the spindle.

10. The storage medium as claimed in claim 6, further comprising:
   after rate adjustment is implemented, determining whether the chatter is suppressed;
   if the chatter is suppressed, executing the determination according to the milling signals; and
   if chatter remains, re-adjusting the rotational rates of the spindle of the milling device.

* * * * *